US005597864A

United States Patent [19]
Leiss

[11] Patent Number: 5,597,864
[45] Date of Patent: Jan. 28, 1997

[54] SINGLE-LAYER OR MULTIPLE-LAYER SURFACE FOIL FOR LAMINATING ON SUBSTRATES

[75] Inventor: Dirk Leiss, Grossburgwedel, Germany

[73] Assignee: Benecke-Kaliko AG, Hanover, Germany

[21] Appl. No.: 509,104

[22] Filed: Aug. 1, 1995

Related U.S. Application Data

[63] Continuation-in-part of Ser. No. 253,154, Jun. 2, 1994, abandoned.

[30] Foreign Application Priority Data

Jun. 2, 1993 [DE] Germany .................... 9308242 U

[51] Int. Cl.$^6$ .................... C08L 55/02; C08L 67/04; C08L 51/04
[52] U.S. Cl. .................... 525/64; 525/71; 428/480; 428/481; 428/514; 428/522
[58] Field of Search .................. 525/64, 71; 428/480, 428/481, 514, 522

[56] References Cited

U.S. PATENT DOCUMENTS

| | | |
|---|---|---|
| 3,954,903 | 5/1976 | Kudo . |
| 4,717,496 | 1/1988 | Brehmer .................... 525/129 |
| 4,929,388 | 5/1990 | Wessling .................... 252/500 |
| 5,250,606 | 10/1993 | Guest .................... 524/504 |

FOREIGN PATENT DOCUMENTS 085460  5/1986  Japan .

*Primary Examiner*—David Buttner
*Attorney, Agent, or Firm*—McAulay Fisher Nissen Goldberg & Kiel, LLP

[57] ABSTRACT

A surface film exhibiting excellent surface tension values, improved notched bar impact strength and minimal white cracking comprising a thermoplastic containing an ABS copolymer and a polycaprolactone.

18 Claims, No Drawings

SINGLE-LAYER OR MULTIPLE-LAYER SURFACE FOIL FOR LAMINATING ON SUBSTRATES

CROSS-REFERENCE TO RELATED APPLICATIONS

The present application is a continuation-in-part of application Ser. No. 08/253,154, filed Jun. 2, 1994 now abandoned, the contents of which are incorporated herein by reference.

BACKGROUND OF THE INVENTION

The invention is directed to a single-layer or multiple-layer surface foil or film based on a thermoplastic plastic for laminating on wood, plastic, metal or other substrates and having a colored, colorless and/or patterned base foil. The inventive foil may contain auxiliary processing agents, coloring agents, stabilizers and other conventional additives.

A surface foil of the type described above is known, for example, from EP-A-0 343 491. It is applied to the surfaces of objects such as doors, frames and housings made of plastic, wood, wood-containing products, metals or the like, including work materials or substrates in colored, colorless and/or patterned form to provide protection against corrosion, discoloration by light or mechanical influences, and the like. It is also used, as the case may be, to give the surface a more attractive appearance. For example, a patterned foil of this kind when laminated on a surface can present the appearance of valuable wood, even when using a starting material not actually suitable for this purpose owing to its quality, texture, surface or color.

The surface foil shown in EP-A-0 343 491 has a base layer made of a polymer of the methacrylate group. The polymer can be modified by adding polyacrylates. A polymethyl methacrylate (PMMA) which is rendered flexible by polybutyl methacrylate (PBMA) is particularly suitable. The known surface foil shows an improved resistance to light and weather. However, tests performed on this foil have shown it to be in need of improvement. For example, PMMA which is rendered flexible exhibits a relatively high degree of white crackling. Even when this material is adjusted so as to be impact-resistant, it provides only a low notched bar impact strength. Further, its wettability and surface tension values are unsatisfactory. High surface tension values are important for the printability of the base foil as well as for its bonding properties (adherence between an adhesive layer and the base foil) if this base foil is to be glued to a substrate. For example, a base foil made of PMMA has a surface tension of only 36 to 38 dyn/cm (measured according to DIN 53 364).

SUMMARY OF THE INVENTION

An object of the invention is to provide an improved surface foil, e.g., film, exhibiting increased surface tension values of the base foil, improved notched bar impact strength, and minimal or no white crackling.

This object is met by the present invention which comprises a thermoplastic plastic containing an ABS copolymer and a polycaprolactone, the polycaprolactone making up approximately 1 to 16 parts by weight for 100 parts by weight of the ABS copolymer having an MFI (220° C./10 kg) of approximately 2 to 12. There are preferably approximately 4 to 8 pans by weight, in particular 5.5 to 6.5 pans by weight, of polycaprolactone for approximately 100 parts by weight ABS copolymer.

An essential characteristic of the present invention is the plastic mixture content of the base foil which contains an ABS copolymer and polycaprolactone. Within the meaning of the invention, the term "thermoplastic plastic" refers to plastics mixtures, polymer blends, polymer alloys or graft copolymers and the like. The ABS copolymer represents the "hard" component in this plastics mixture, while the polycaprolactone is the "softer" component which is essential to enable calendering.

This object is met, according to the invention, in that the thermoplastic plastic is characterized by the following constituents: a) an ABS copolymer having a MFI (220° C./10 kg) of approximately 2 to 12 g/10 minutes, b) a polycaprolactone and, where appropriate, c) an elastomer-modified styrene-acrylonitrile copolymer (SAN), wherein the elastomer component is a grafted acrylate-rubber. Of 100 parts by weight ABS copolymer, polycaprolactone makes up approximately 1 to 16 parts by weight and the elastomer-modified styrene-acrylonitrile copolymer (SAN) makes up 0 to 20 parts by weight, especially approximately 2 to 18 pans by weight.

An essential characteristic of the present invention is that the base foil or sheet contains a thermoplastic mixture having the specified amount of an ABS copolymer with the indicated MFI and polycaprolactone. As used herein, the term "thermoplastic plastics" refers to plastics mixtures, polymer blends, polymer alloys or graft copolymers and the like. The ABS copolymer makes up the "hard" component in this plastics mixture, while the polycaprolactone is the "softer" component which is essential to enable calendering.

For the purposes of the invention, an ABS copolymer having a MFI (220° C./10 kg) of approximately 2 to 12 g/10 minutes is used. This MFI value is determined according to DIN 53 735 and ISO 1133, 1991 edition. If the MFI value falls below approximately 2 g/10 minutes, technical process-related problems will occur during manufacture of the surface sheet resulting in unwanted surface defects. If the approximate value 12 g/10 minutes is exceeded, the affinity of the sheet to the hot calender rolls will be too high during manufacture of the sheet due to the low melting stability, so that it cannot be produced in the desired manner. Moreover, exceeding the value of 12 g/10 minutes will result in insufficient graining resistance in the sheet when processed. This leads to an appreciable reduction in grain depth after processing, i.e., after laminating on the substrate in the manner discussed in the preceding. The MFI value of the ABS copolymer used is preferably in the range of approximately 4 to 8 g/10 minutes.

The thermoplastic of the surface sheets according to the invention optionally contains an elastomer-modified styrene-acrylonitrile copolymer (SAN), wherein the elastomer component is preferably in the form of a grafted acrylate-rubber, in particular, products with grafter butadiene-acrylic ester or acrylic ester-rubber. A SAN copolymer grafted with butylacrylate rubber is especially preferred. The elastomer-modified styrene-acrylonitrile copolymer (SAN) is preferably mixed with an acrylonitrile-butylacrylate rubber, this mixture containing approximately 30 to 50 percent by weight of acrylonitrile-butylacrylate rubber, in particular, approximately 37 to 43 percent by weight.

A high acrylate rubber proportion, preferably between approximately 30 and 75 percent by weight, particularly preferably between approximately 55 and 65 percent by weight, in the elastomer-modified styrene-acrylonitrile copolymer (SAN) improves the melting stability during processing at high temperatures. This results in very good grain reproduction when processing on the pressed finished article. Fundamentally, the rigidity (modulus of elasticity), hardness and tensile strength are also advantageously regulated in this way in accordance with the applied portion.

Quantitative constraints such as those already mentioned above must also be maintained for the effects which can be achieved by the invention; i.e., of 100 parts by weight of ABS copolymer with the indicated MFI range, there are approximately 1 to 16 parts by weight polycaprolactone, in particular, approximately 4 to 8 parts by weight, especially preferably 5.5. to 6.5 parts by weight polycaprolactone. Moreover, there are approximately 0 to 20 parts by weight, in particular approximately 2 to 18 parts by weight, elastomer-modified styrene-acrylonitrile copolymer (ASA) for 100 parts by weight of ABS copolymer.

DETAILED DESCRIPTION OF THE INVENTION

The thermoplastic plastic used within the framework of the invention is preferably an ABS copolymer having a MFI (220° C./10 kg) of approximately 4 to 8, in particular an elastomer-modified thermoplastic. Styrene copolymers, in particular elastomer-modified styrene/acrylonitrile (SAN) copolymers are preferred as elastomer-modified thermoplasts. Rubber-grafted SAN copolymers are particularly preferred as elastomer-modified SAN copolymers. The rubber-grafted SAN copolymers are preferably rubber-grafted products of butadiene acrylic ester, EPDM or acrylic ester. A SAN copolymer grafted with butyl acrylate rubber is particularly preferred. An acrylonitrile/butyl acrylate copolymer is preferably added to the elastomer-modified thermoplast, since a particular advantage is gained when there are approximately 40 parts by weight of acrylonitrile/butyl acrylate copolymer for 100 parts by weight of elastomer-modified thermoplasts. The importance of the advantageous use of the elastomer-modified styrene copolymer according to the invention consists in that the rigidity (modulus of elasticity), hardness and tensile strength can be regulated as desired by varying the amount of copolymer included.

The characteristics of the base foil can be modified by additives which are incorporated in the thermoplastic plastic. For example, the plastic may contain fillers, such as, metal oxide, metal carbonates, in particular calcium carbonate and dolomite, metal dioxides and metal hydroxides, slip additives, such as, C12-C36 fatty acids, fatty alcohols, esters and amides of fatty acid, coloring agents in the form of color pigments, e.g. titanium dioxide or soot, and organic dyes, stabilizers, such as, oxidation retardants and heat stabilizers, such as, sterically hindered phenols, hydroquinones, substituted representatives of this group and mixtures thereof, UV stabilizers, e.g. various substituted resorcinols, salicylates, benzotriazoles and benzophenones, as well as other common modifiers. Processing aids, such as, high-molecular acrylates or acrylate copolymers, such as, the commercial product Paraloid K-125 can also be used as additives. They control the flow properties and the melting during processing. With the aid of the starting mixture containing the compounds mentioned above, the base foil can be produced by various techniques, e.g., by extrusion, calendering and the like.

The form of cover layer is not decisive for achieving the desired effects. It may be a conventional cover foil or also a lacquer coat. Cover layers such as those described in EP-A-0 343 491 are also readily used. They are distinguished by good mechanical properties, e.g., edge-tear resistance, impact strength, scratch resistance and resistance to chemicals, and can be lacquered or coated for repair purposes. The cover layer can be a sheet or foil produced from polyacrylate or polyvinylidene fluoride (PVDF), polyvinyl fluoride (PVF), polycarbonate and polyester and the like. The cover foil can be applied to the base foil by suitable lamination.

The desired physical characteristics, such as, high notched bar impact strength and high surface tension with extensive protection against white crackling may be adjusted in the surface foil according to the invention. For example, it exhibits surface tensions of approximately 46 to 52 dyn/cm (according to DIN 53 364). These surface tensions are significantly higher than those achieved in surface foils of the prior art described above (36 to 38 dyn). High surface tensions improve printability, e.g. when applying colored patterns, and the adhesion of an adhesive layer. Moreover, the surface foil according to the invention is characterized by a favorable modulus of elasticity, tensile strength, hardness, light fastness and stability against hot light.

The invention is characterized by a number of additional advantages. Styrene-containing copolymers are primarily used as raw material. These styrene-containing copolymers have the advantage in that the processing temperatures of the foils manufactured therefrom are in the order of magnitude of those of PVC foils (approximately 65° to 95° C.). In addition, the material can be provided with stability against light and weather. The possibility of applying lacquer ensures resistance to chemicals. Different color shades can be adjusted by means of emollient/pigment batches. The material can be calendered and extruded in existing production installations. The surface can be provided with different decorations by means of embossing devices. Within the framework of the invention, it is not absolutely necessary to use metal-containing or sulfur-containing compounds in the stabilizers to achieve the desired effects as is required in PVC-containing plastics mixtures.

Another advantage of the foil according to the invention is that it exhibits improved aging behavior under the influence of dark heating (without the influence of light). Finally, the desired hardness can also be advantageously optimized within the framework of the invention so as to have a favorable influence on its sensitivity to writing and scratching. Different substrates can be laminated with the surface foil according to the invention in a variety of ways. It is possible to carry out lamination and deformation simultaneously, e.g. with non-planar surfaces. For example, suitable devices work with diaphragms, air pressure and forming rollers.

The special composition of the foil according to the invention, due primarily to the elastomer-modified styrene copolymer which is preferably used, makes it possible to laminate undercuts (deep formed-out portions) in one processing step.

The invention will be described in more detail in the following with reference to examples.

EXAMPLES 1 TO 4

A base foil with a thickness of approximately 0.4 mm was produced by means of a 5-L rolling calender using the recipes shown in the following table. Various properties of this base foil were measured and the results are shown in the following table.

TABLE

| Examples | 1 | 2 | 3 | 4 |
|---|---|---|---|---|
| Composition (in %) | | | | |
| acrylonitrile/butadiene/styrene copolymer (ratio of components: 29%:16%:55% trade name: Cycolac G PX 11) | 85 | 96 | 87 | 87 |
| polycaprolactone (trade name: Tone Polymer P 767 manufactured by Union Carbide) melting point: 60° C. | 6 | 4 | 3 | 3 |
| elastomer-modified styrene copolymer I | 8.7 | — | — | — |
| elastomer-modified styrene copolymer II | — | — | 9.7 | — |
| elastomer-modified styrene copolymer III | — | — | — | 9.7 |
| Primary antioxidant: sterically hindered phenol (Tinuvin 770/sold by Ciba Geigy) | 0.1 | 0.1 | 0.1 | 0.1 |
| UV absorber: benzotriazole (Irganox 1010/ sold by Ciba Geigy) | 0.2 | 0.2 | 0.2 | 0.2 |

Remarks concerning the elastomer-modified styrene copolymers:

Elastomer-modified styrene copolymer I: Styrene/acrylonitrile copolymer, grafted on butyl acrylate rubber (trade name: BAYMOFLEX 2069, sold by Bayer AG), blended with acrylonitrile/butyl acrylate rubber (ratio: 60%:40%).

Elastomer-modified styrene copolymer II: Same as I, but grafted on butyl acrylate rubber (without blending components) (trade name: BAYMOFLEX 2079, sold by Bayer AG), Elastomer-modified styrene copolymer III: Styrene/acrylonitrile copolymer, grafted on butyl acrylate rubber (butyl acrylate rubber content: 46 percent by weight) (trade name: BLENDEX WX 01, sold by General Electric Plastics).

The base foils according to the invention show superior Shore hardness D, modulus of elasticity and tensile strength.

I claim:

1. A surface sheet having at least one layer for laminating on wood, plastic, metal or other substrates and having a colored, colorless or patterned base sheet of a thermoplastic plastic comprising:

a) an ABS copolymer having a MFI (220° C./10 kg) of approximately 2 to 12 g/10 minutes;

b) a polycaprolactone in an amount from about 1 to 16 parts by weight; and c) from about 2 to 20 parts by weight of an elastomer-modified styrene-acrylonitrile copolymer (SAN) having an elastomer component of a grafted acrylate-rubber, all parts by weight being based on 100 parts by weight of ABS polymer.

2. The surface sheet of claim 1 wherein the amount of SAN copolymer is from about 2 to 18 parts by weight.

3. The surface sheet of claim 1 wherein the ABS copolymer has a MFI (220° C./10 kg) of approximately 4 to 8 g/10 minutes.

4. The surface sheet of claim 2 wherein the ABS copolymer has MFI (220° C./10 kg) of approximately 4 to 8 g/10 minutes.

5. The surface sheet of claim 1, wherein the elastomer component in the elastomer-modified SAN is a grafted butylacrylate rubber.

6. The surface sheet of claim 2, wherein the elastomer component in the elastomer-modified SAN is a grafted butylacrylate rubber.

7. The surface sheet of claim 3, wherein the elastomer component in the elastomer-modified SAN is a grafted butylacrylate rubber.

8. The surface sheet of claim 4, wherein the elastomer component in the elastomer-modified SAN is a grafted butylacrylate rubber.

9. The surface sheet of claim 1, wherein the elastomer-modified styrene-acrylonitrile copolymer (SAN) is mixed with 30 to 50 percent by weight thereof of an acrylonitrile-butyl acrylate rubber.

10. The surface sheet of claim 2, wherein the elastomer-modified styrene-acrylonitrile copolymer (SAN) is mixed with 30 to 50 percent by weight thereof of an acrylonitrile-butyl acrylate rubber.

11. The surface sheet of claim 3, wherein the elastomer-modified styrene-acrylonitrile copolymer (SAN) is mixed with 30 to 50 percent by weight thereof of an acrylonitrile-butyl acrylate rubber.

12. The surface sheet of claim 4, wherein the elastomer-modified styrene-acrylonitrile copolymer (SAN) is mixed with 30 to 50 percent by weight thereof of an actrylonitrile-butyl acrylate rubber.

13. The surface sheet of claim 9 wherein the amount of acrylonitrile butyl acrylate rubber is from about 37 to 43 percent by weight.

14. The surface sheet of claim 10 wherein the amount of acrylonitrile butyl acrylate rubber is from about 37 to 43 percent by weight.

15. The surface sheet of claim 11 wherein the amount of acrylonitrile butyl acrylate rubber is from about 37 to 43 percent by weight.

16. The surface sheet of claim 12 wherein the amount of acrylonitrile butyl acrylate rubber is from about 37 to 43 percent by weight.

17. The surface sheet of claim 1 wherein the amount of polycaprolactone is from about 5.5 to 6.5 parts by weight.

18. The surface sheet of claim 1 wherein the elastomer component in the elastomer modified SAN is a grafted butadiene-acrylic ester or acrylic ester-rubber.

\* \* \* \* \*